United States Patent
Van Ingen et al.

(10) Patent No.: US 7,676,503 B2
(45) Date of Patent: Mar. 9, 2010

(54) HYBRID COMPUTER RESTORE USING NETWORK SERVICE

(75) Inventors: Catharine Van Ingen, Bellevue, WA (US); Anatoliy Panasyuk, Bellevue, WA (US); Steve E. Olsson, Camano Island, WA (US); Guhan Suriyanarayanan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 384 days.

(21) Appl. No.: 11/563,509

(22) Filed: Nov. 27, 2006

(65) Prior Publication Data

US 2008/0126444 A1    May 29, 2008

(51) Int. Cl.
G06F 12/00 (2006.01)
G06F 17/30 (2006.01)
G06F 11/00 (2006.01)
G06F 13/00 (2006.01)
G06F 13/28 (2006.01)

(52) U.S. Cl. .................. 707/202; 707/204; 714/15; 711/161; 711/162

(58) Field of Classification Search ................ 707/202, 707/204; 714/15; 711/161, 162
See application file for complete search history.

(56) References Cited

U.S. PATENT DOCUMENTS

| | | | |
|---|---|---|---|
| 6,195,695 B1 | 2/2001 | Cheston et al. | |
| 6,535,998 B1 | 3/2003 | Cabrera et al. | |
| 6,560,726 B1 | 5/2003 | Vrhel, Jr. et al. | |
| 6,785,695 B1 | 8/2004 | Hamilton, II et al. | |
| 6,802,025 B1 | 10/2004 | Thomas et al. | |
| 6,931,558 B1 | 8/2005 | Jeffe et al. | |
| 6,948,099 B1 | 9/2005 | Tallam | |
| 7,089,449 B1 | 8/2006 | Cluff et al. | |
| 2004/0098426 A1 | 5/2004 | Ishii et al. | |
| 2004/0236984 A1 | 11/2004 | Yamasaki | |
| 2005/0138408 A1 | 6/2005 | Vanover et al. | |
| 2006/0036895 A1 | 2/2006 | Henrickson | |
| 2006/0149997 A1 | 7/2006 | Chai et al. | |
| 2006/0161802 A1 | 7/2006 | Wang et al. | |
| 2006/0168389 A1* | 7/2006 | Bentley | 711/2 |
| 2006/0230081 A1* | 10/2006 | Craswell et al. | 707/204 |
| 2007/0100913 A1* | 5/2007 | Sumner et al. | 707/204 |
| 2008/0065645 A1* | 3/2008 | Eichhorn | 707/10 |
| 2008/0126445 A1* | 5/2008 | Michelman | 707/204 |

OTHER PUBLICATIONS

Bohra et al., "Remote Repair of Operating System State Using Backdoors", Proceedings of The International Conference on Autonomic Computing (ICAC-04), pp. 1-8, 2004.

(Continued)

*Primary Examiner*—James Trujillo
*Assistant Examiner*—Bruce M. Moser
(74) *Attorney, Agent, or Firm*—Vierra Magen Marcus & DeNiro LLP (57) ABSTRACT

A backup file is generated to capture the current state of a computer. The computer state may be restored to the computer in a hybrid manner at a later time by accessing some files and/or data included in the backup file and downloading other files contained in a list in the backup file. By listing some files rather than including the actual files in the backup file, the backup file may be generated faster and require less processing and memory resources. When the computer state is restored, secondary files and computer state data contained in the backup file are installed to the computer. A list of primary files in the backup file is accessed, each primary file is retrieved from one or more remote publishers over a network, and the retrieved primary files are installed.

20 Claims, 8 Drawing Sheets

OTHER PUBLICATIONS

Sultan, et al., "Recovering Internet Service Sessions from Operating System Failures", IEEE Internet Computing, pp. 24-34, Mar./Apr. 2005.

Wang, et al., "Detecting Stealth Software with Strider GhostBuster", Technical Report MSR-TR-2005-25, Microsoft Corporation, 2005.

Oppenheimer, et al., "Why do Internet Services Fail, and What Can be Done About It?", University of California at Berkeley, EECS Computer Science Division, 4th Usenix Symposium on Internet Technologies and Systems (USITS '03), 2003.

* cited by examiner

HYBRID COMPUTER RESTORE USING NETWORK SERVICE

BACKGROUND

As computer technology develops and the use of the Internet becomes more widespread, computers are relied on to handle more tasks and manger more information for computer users. As this reliance increases, it becomes more important to provide an efficient, effective and simple way to backup data and restore a computer state in case a computer "crashes" or otherwise malfunctions.

Traditionally, a computer may be restored by installing a copy of all the data, files and settings on the computer that was saved prior to the computer malfunction or attempting to manually reinstall each computer file, application and computer setting after a malfunctioning state has developed. Saving a complete copy of the computer state requires processing and storage of a large amount of data as well as remembering to store the data at regular intervals. Generating the computer state manually does not require a large computer state image but does require the user have knowledge of what files, applications, drivers, operating system settings and other data were installed and configured on the user's computer. In some cases, this knowledge is in the backup application and not necessarily known to a user. Thus, a restore from anything other than a "full" copy of the computer state is highly risky and making that full copy has historically been expensive. A process of saving and restoring a computer state efficiently and effectively which saves processing and memory resources would be desirable.

SUMMARY

The present technology generates a backup file to capture the current state of a computer. The computer state may be restored in a hybrid manner at a later time using the backup file. The hybrid manner of restoring involves accessing one or more files and/or data included in the backup file and downloading one or more files contained in a list in the backup file. The files contained in the list are not contained in the backup file. By including one or more files in a list rather than including the actual files themselves, the computer state backup file may be generated faster, require less processing and memory resources, and be accessed faster than a backup file that contains the files in their entirety.

The backup file may consist of restore data which includes operating system settings and data, files, drivers and other data. Files making up the computer state that are accessible over a network from a publisher of the file are included in a list of primary files. The primary files themselves are not included in the backup file restore data. Files which can not be accessed over a network or for which the file publisher information is not available are included in the restore data as secondary files. The secondary files, the list of primary files, and other computer state data comprise the restore data and are stored as the backup file. When the computer state is restored, the secondary files and computer state data contained in the backup file are installed to the computer. The list of primary files in the backup file is accessed, each primary file is retrieved from one or more remote publishers over a network, and the retrieved primary files are installed.

One embodiment restores a computer state by retrieving computer restore data by a restore manager. The restore data contains computer state data, one or more secondary files and a list of one or more primary files previously installed on the computer and associated with a first computer state. The primary files in the list are retrieved by the restore manager from file publishers over a network. The retrieved primary files, the one or more secondary files and the computer state data are installed to the computer to restore the first computer state on the computer.

In some embodiments, primary files and other data may be accessed from a location other than over a network, such as from a disk that is mailed to a user, from a master USB disk or from some other location or in some other manner.

An embodiment stores a computer state by generating a list of primary files installed on a computer. Each primary file in the list is typically accessible from one or more file publishers over a network. Computer state data is accessed from a computer operating system of the computer. The computer state data, one or more secondary files and the primary file list is saved as restore data in a backup file. The secondary files are not accessible from the one or more file publishers. The restore data is associated with a current state of the computer.

An embodiment may configure an update service with information associated with a first primary file located on a computer. The update service may be in communication with the computer operating system. A list of one or more primary files and computer state data may be stored in a backup file. The list of one or more primary files may include a listing for the first primary file. A restore manager on the computer may then retrieve the backup file and automatically invoke the update service to install the first primary file to the computer.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

DETAILED DESCRIPTION

A backup file is generated to capture the current state of a computer. The computer state may be restored at a later time using the backup file in a hybrid manner. The hybrid manner of restoring involves accessing one or more files or data which are included in the backup file and downloading or otherwise accessing one or more files that are listed in the backup file. The files that are listed in the backup file are not contained in the backup file. By including one or more files in a list rather than including the actual files themselves and retrieving the files over a network when the computer state is restored, the computer state backup file may be generated faster, may require less processing and memory resources to restore, and be accessed faster than a backup file that contains the files in their entirety.

The backup file may consist of restore data which includes operating system settings and data, files, drivers and other data. Files making up the computer state that are accessible over a network from a publisher of the file are included in a list of primary files. The primary files themselves are not included in the backup file restore data. Files which can't be accessed over a network or for which the file publisher information is not available are included in the restore data as secondary files. The secondary files, the list of primary files, and other computer state data comprise the restore data and are stored as the backup file. When the computer state is restored, the secondary files and computer state data contained in the backup file are installed to the computer. The list of primary files in the backup file is accessed, each primary file is retrieved from one or more remote publishers over a network, and the retrieved primary files are installed. Installing the files in a hybrid manner by installing files contained in the backup file itself and from file publishers over a network allows for a smaller backup file that is generated quicker, takes up less storage space, and is easier to access.

A computer system update service may be used to perform part of a computer restore process. An update service may typically be invoked by a computer operating system to provide any updates for the computer operating system, operating system settings, certain files installed on the computer and other related data. The present technology may utilize the update service as part of restoring the computer state. For example, some of the files in the primary file list may be supported by the update service (e.g., files that the update service may provide updates for). If one or more primary files on the list are supported by the update service, the update service may be invoked to provide the files to the computer when the computer state is being restored. Thus, certain files, operating system settings and other data supported by the update service do not have to be included into the back-up file. Rather, only identification information for the update service supported files and data is stored in the backup file, for example, in the form of a list of primary files.

For example, the update service may be implemented as a service called "Windows Update," provided by Microsoft Corporation of Redmond, Wash. The computer operating system may be implemented by "Windows XP Operating System" by Microsoft Corporation, or a related operating system such as "Windows XP Professional Operating System" and may be configured to automatically receive updates from the update service. Primary files that may be updated using the update service may include "Microsoft Word," "Microsoft Excel," or some other application by Microsoft Corporation. These primary files may be added to the list of primary files in the backup file. When a computer state needs to be restored, "Windows Update" may be used to download new copies of "Microsoft Word" and "Microsoft Excel" from a list of primary files contained in the backup file. This is discussed in more detail below.

Other primary files in the list of primary files may be obtained from one or more publishers other than the update service for the computer operating system. Typically, a publisher is invoked in response to receiving a user request to download a file or provide a file update upon application invocation. In some embodiments, a primary file setting may be configured so that the publisher is invoked to provide an update for an application automatically by the computer operating system. In any case, the present technology stores the primary file name, publisher location (e.g., a URL), version number and optionally other data for a primary file accessible over a network from a publisher (other than an update service). When a computer state is restored, restoring the primary file includes using the stored primary file information to invoke the publisher to provide a copy of the file over the network. In some embodiments, the publisher may be automatically invoked to provide the primary file in response to initiating a computer state restore. For example, a primary file may be the software application "Adobe Acrobat," which may be retrieved from a URL for the publisher which is implemented by Adobe Systems Incorporated of San Jose, Calif.

In some embodiments, a primary file may actually be an application comprised of more than one file. Thus, accessing or retrieving a primary file as discussed herein may involve accessing or retrieving two or more files that comprise an application. Unlike the present technology, traditional backups typically operate file-by-file and have little or no idea of how a given collection maps to an application. By having the negotiation between a restore service and an application owner (for example, an update service or file publisher, discussed in more detail below), the present technology enables faster backup and the correct restore.

In some embodiments, the primary files installed as part of restoring the computer state may improve the computer state by also installing primary file updates. Generally, some file publishers provide updates for a primary file as they are modified over time. The updates may be improvements, bug fixes, software patches, or other changes to a primary file. Updates may be provided by a publisher (either an update service or other publisher) between the time the computer state was last saved and the time the computer state is restored. Primary file updates provided between the time the computer state is saved and the time the saved computer state is used to restore a computer may be accessed and installed when the primary files themselves are installed. In some embodiments, when a primary file is being restored, the present technology will query the publisher for updates available for the primary file. Installing a primary file update as part of restoring a computer state is discussed in more detail below.

In some embodiments, a computer state may be captured in more than one file. In some embodiments, restore data for a computer state may be contained in a main backup file and one or more supplementary backup files. The main backup file will usually be larger than the supplementary backup file(s) and contain the operating state data, secondary files, a list of primary files and possibly other data. A supplementary backup file may contain changes to the computer state captured in the main backup file that were detected since the main backup file was generated or changes since the last supplementary backup file. Supplementary backup files may be generated based on certain events, a period of time, in response to a user request, or some other event. For example, a main backup file may contain operating system data, three secondary files and a list of four primary files corresponding to the computer state at the beginning of a month. A supplementary backup file may contain a new driver for one of the secondary files and of two more primary files to add to the primary file list and be generated halfway through the month. The computer state changes to be included in a supplementary backup file may be tracked by an operating system process that tracks changes to the computer or some other process. In one embodiment, changes to a computer state that are included in a supplementary backup file are identified by a "System Restore" process of "Windows XP Operating System" of Microsoft Corporation. Thus, there may be a negotiation between a restore service and a trusted local service to the computer. Both the main backup file and supplementary backup file may be stored locally or on a remote server. In some embodiments, the main backup and supplementary backup files may also be combined into one backup file. Generation of backup files is discussed in more detail below.

Figure 1A:
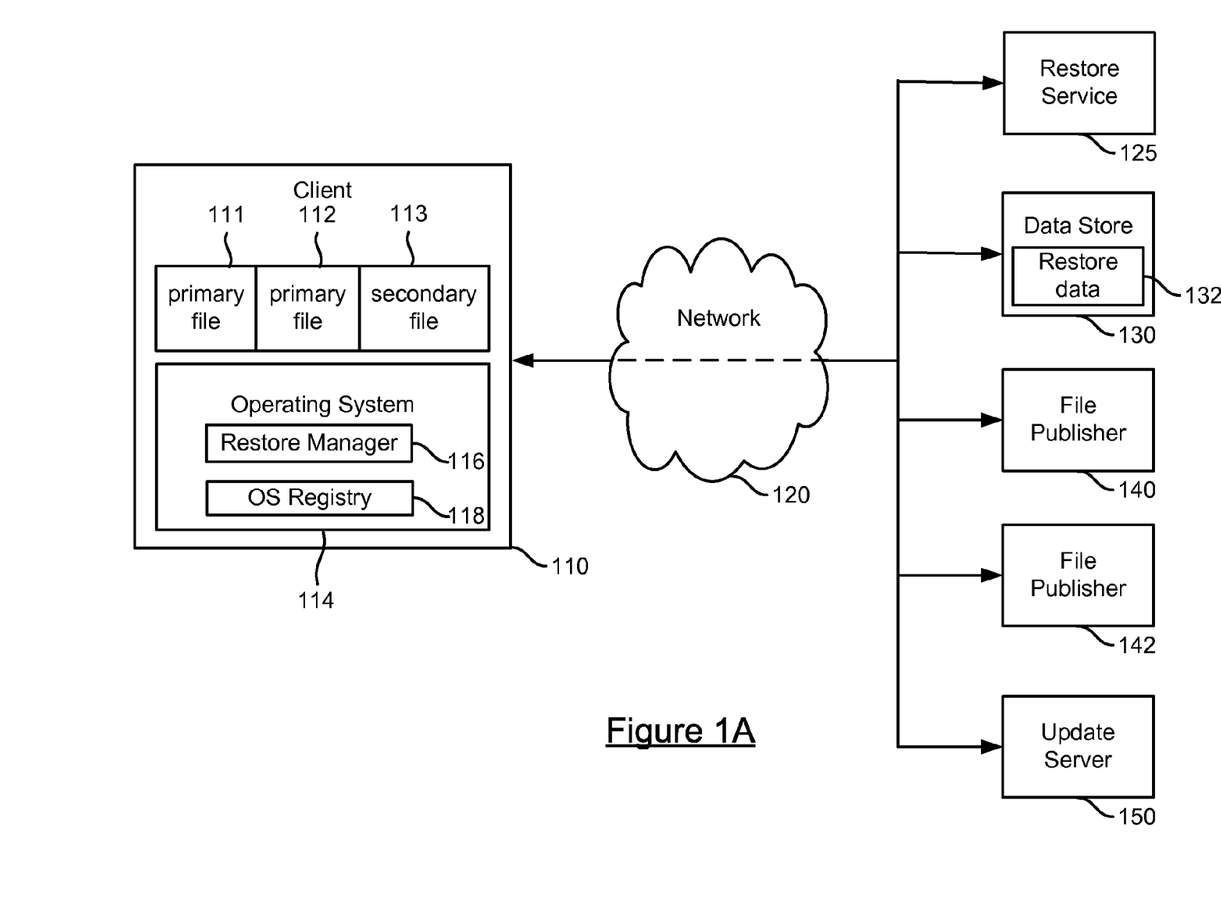
FIG. 1A is a block diagram of a system for restoring a computer state.

FIG. 1A is a block diagram of a system for restoring a computer state. The system of FIG. 1A includes client 110, network 120, restore service 125, data store 130, file publishers 140 and 142 and update server 150. Data store 130, file publishers 140-142 and update server 150 communicate with client 110 over network 120. In some embodiments, network 120 may be implemented as a public or private intranet or internet In some embodiments, network 120 may be implemented as the Internet.

Client 110 may include operating system 114, primary files 111-112 and secondary files 113. Operating system 114 may run other programs, interface with external devices, and perform other basic computer operation tasks. Operating system 114 may include a restore manager 116 and operating system registry 118.

Restore manager 116 may generate backup files and store backup files to data store 130. Restore manager may also restore a computer state by accessing stored backup files, retrieving primary files from primary file information in a backup file, and installing retrieved primary files, secondary files, operating system settings and other data and any other restore data contained in the backup file. To manage the capturing, storing and restoring of a computer state, restore manager may communicate and/or initiate communication with data store 130, file publishers 140-142 and update server 150. In some embodiments, the present technology allows for local "agents" of file publishers. An agent may provide restore manager 116 with one or more files to be included in the list of primary files. The agents may be in communication with a file publisher that notifies the agents of recent updates, software patches and other information regarding a primary file. Thus, restore manager 116 may receive primary file information from local sources rather than from a system over a network.

Operating system registry 118 stores information which describes computer hardware, selected system options, the configuration of computer memory, application programs recognized by the operating system, and other computer data. Some or all of the data stored in registry 118 may be accessed by restore manager 116 and stored in a backup file as well as configured by restore manager 116 when restoring a computer state. Other stores in addition to the registry may be accessed by restore manager 116 and stored in the backup file and configured by restore 116 when restoring a computer state. The data in an operating system registry and other computer stores may be stored as a primary files, secondary files or a combination thereof.

Primary files 111-112 and secondary file 113 are a first set of one or more files and a second set of one or more files, respectively, that may reside and/or execute on operating system 114. A primary file is any file that may be stored on a computer that is accessible by client 110 from one of file publishers 140-142 or update server 150. A secondary file may be any file which is not recognized to be available from any of file publishers 140-142 or update server 150 at the time a computer state backup file is generated and is stored as restore data within a backup file. In one embodiment, the primary files and secondary files may contain operating system files or program files. In one embodiment, binary files that make up each secondary file are placed in the backup file. In some embodiments, the binary files referred to herein may include traditional non-text binary files or text files. Both primary files and secondary files may be implemented as application programs, application templates, configuration files, or any other type of file.

Restore service 125 may handle restore control and data file movement with respect to a computer restore and may be implemented as part of data store 130 or as a separate machine or system. Restore service 125 may perform control communications with client 110 and each file publisher 140-142 and update service 150. Restore service may control transmission of data files with client 110. In particular, data file movement may occur from a file publisher or update service to restore service 125 (when the restore service acts on behalf of the file publisher or update service) and thence to the restore manager executing on the client. Data file movement may also occur from a file publisher or update service directly to the client when the file publisher or update service acts on request from the restore service. In some embodiments, operation discussed below with respect to transmitting and managing of content to and from data store 132 may be handled by restore service 125. Operation of restore service 125 is discussed in more detail below.

Data store 130 may store a backup file having restore data for one or more client computers such as client 110 and process queries and/or requests to create, read, update and delete the restore data 132. Restore data 132 is discussed in more detail with respect to FIG. 1B. The requests may be received from client 110 or some other source. Data store 130 may be implemented as a database, a server, or some other machine or device. In some embodiments, data store 130 may be implemented within client 110 or at some location other than over network 120.

Exemplary embodiments are discussed herein with respect to communications between modules of the system of FIG. 1A over network 120. It is understood that restore data, primary files and other content can be exchanged and transmitted between modules of the system of FIG. 1A in a manner other than over network 120.

Each of file publishers 140-142 may be implemented as a server, group of servers or some other system that publishes or otherwise may provide a primary file and/or one or more updates to a primary file to client 110 over network 120. Operation of a file publisher is discussed in more detail below. The application and/or updates may be provided automatically or upon a request or query received from client 110.

Update server 150 may be implemented as a server, group of servers or some other system that may provide updates to a computer operating system such as operating system 114 of client 110 and one or more primary files. For example, the update server may be part of an updating service operated by Microsoft Corporation for its Windows operating system. In this embodiment, update server 150 may implement "Windows Update" service and provide updates for "Windows XP" or a related operating system, office applications such as "Microsoft Word", and "Microsoft Excel" and other Microsoft applications. In some embodiments, an update server may be implemented as a file publisher. In some embodiments, a file publisher may be implemented as an update server.

In some embodiments, each of restore service 125, data store 130, file publishers 140-142 and update server 150 may communicate with each other over network 120 or some other network in addition to communicating with client 110 over network 120 (or some other network, not illustrated).

Figure 1B:
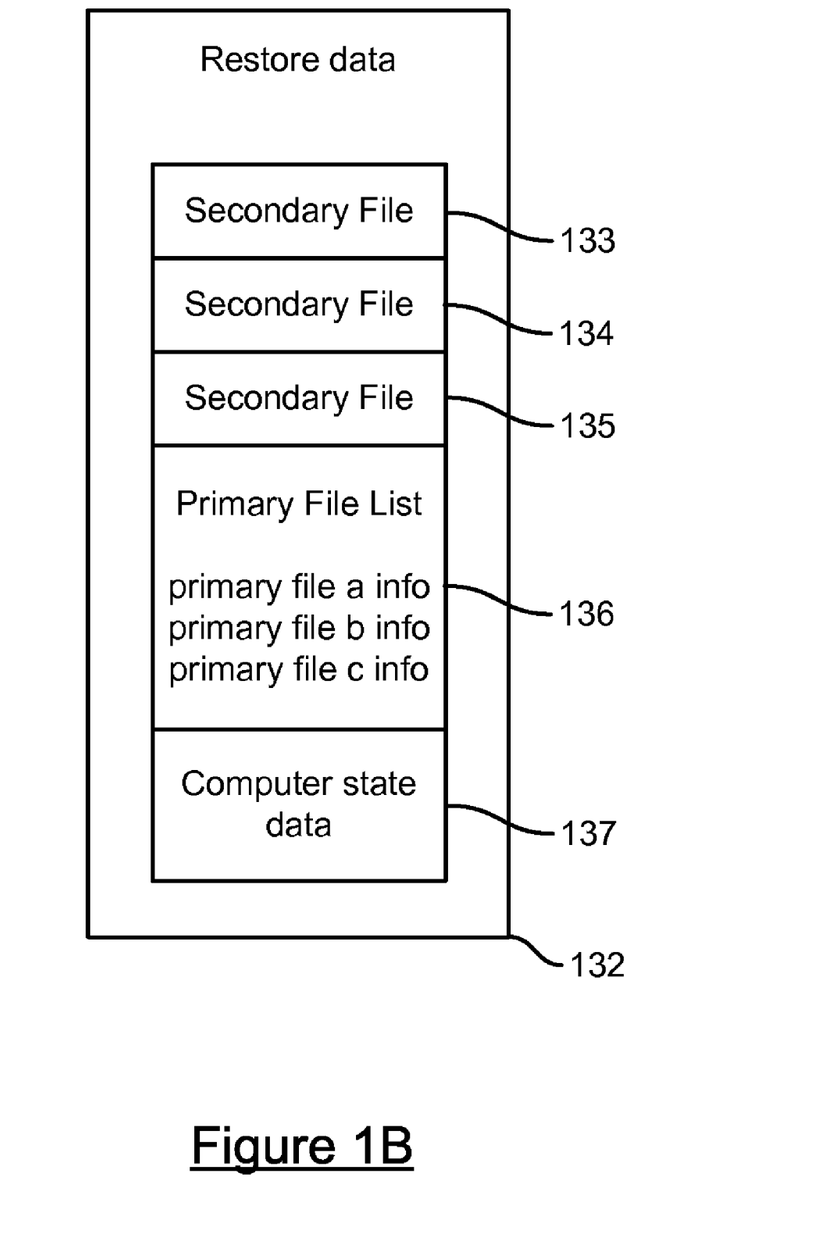
FIG. 1B is a block diagram of an example of restore data.

FIG. 1B is a block diagram of an example of restore data 132 and provides more detail of restore data 132 contained in data store 130 of FIG. 1A. Restore data 132 includes secondary files 133-135, primary file list 136 and computer state data 137. The data comprising each of secondary files 133-135 may include binary files, such as executable files, configuration files, and other files required to install the particular secondary file. Primary file list 136 may include a list of files and file information that are available over network 120 from one of file publishers 140-142 or update server 150. The file information may include a file name, version, date originally installed, information regarding updates available for the file, location of the file publisher and/or update server from which the primary file is available, and other data. Computer state data may include registry data, computer name data, driver data, and any other data that is custom to the computer being restored which is not available from one of file publisher 140-142 or update server 150.

Figure 2:
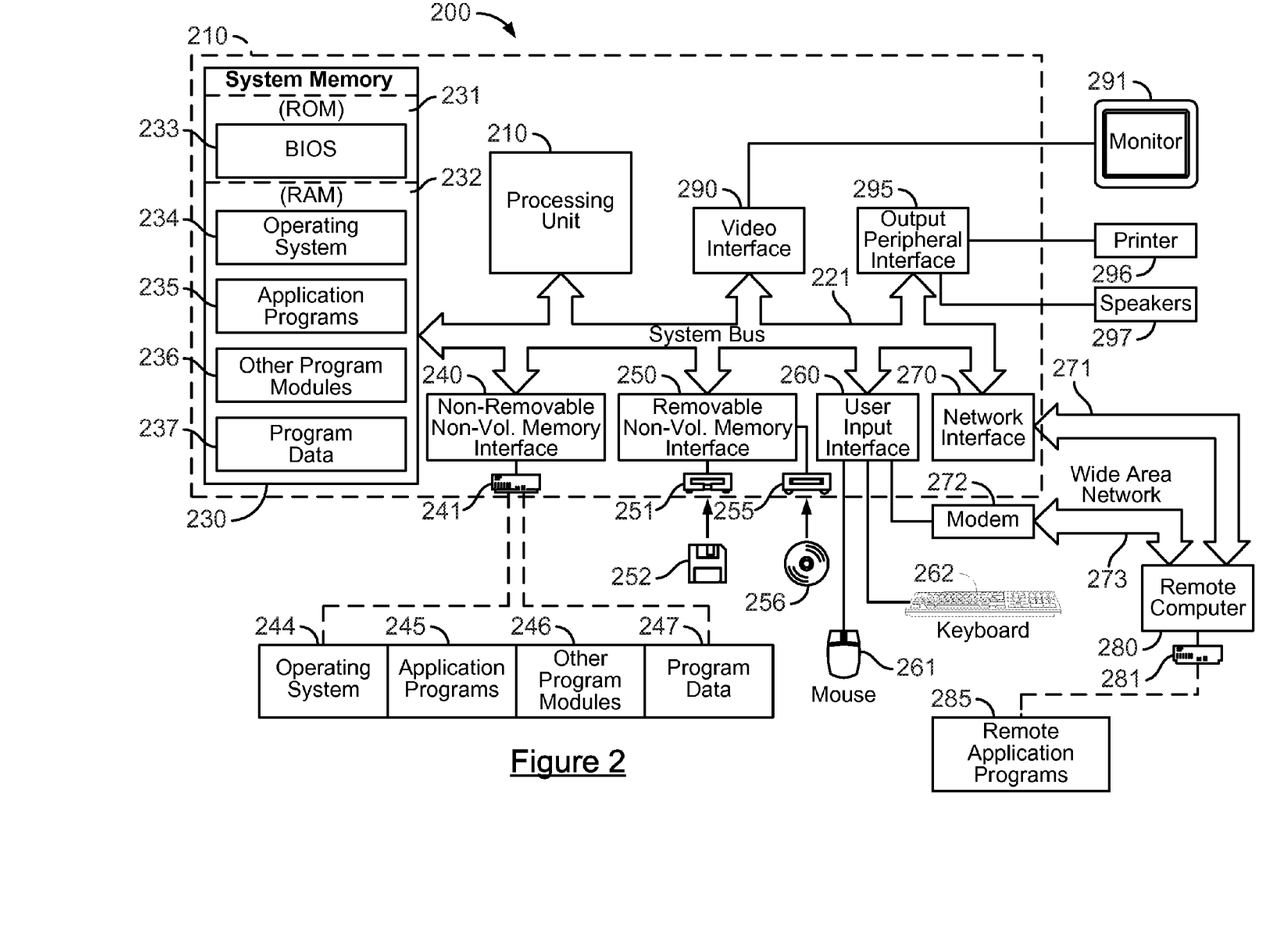
FIG. 2 is a block diagram of a computing environment for implementing the present technology.

FIG. 2 is a block diagram of a computing environment for implementing the present technology. In some embodiments, the computing environment of FIG. 2 may be used to implement client 110, data store 130, file publishers 140-142 and update server 150.

FIG. 2 illustrates an example of a suitable computing system environment 200 on which the present technology may be implemented. The computing system environment 200 is only one example of a suitable computing environment and is not intended to suggest any limitation as to the scope of use or functionality of the technology. Neither should the computing environment 200 be interpreted as having any dependency or requirement relating to any one or combination of components illustrated in the exemplary operating environment 200.

The technology is operational with numerous other general purpose or special purpose computing system environments or configurations. Examples of well known computing systems, environments, and/or configurations that may be suitable for use with the technology include, but are not limited to, personal computers, server computers, hand-held or laptop devices, cell phones, smart phones, multiprocessor systems, microprocessor-based systems, set top boxes, programmable consumer electronics, network PCs, minicomputers, mainframe computers, distributed computing environments that include any of the above systems or devices, and the like.

The technology may be described in the general context of computer-executable instructions, such as program modules, being executed by a computer. Generally, program modules include routines, programs, objects, components, data structures, etc. that perform particular tasks or implement particular abstract data types. The technology may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the technology includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 240 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 20 through input devices such as a keyboard 262 and pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 290.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

Figure 3:
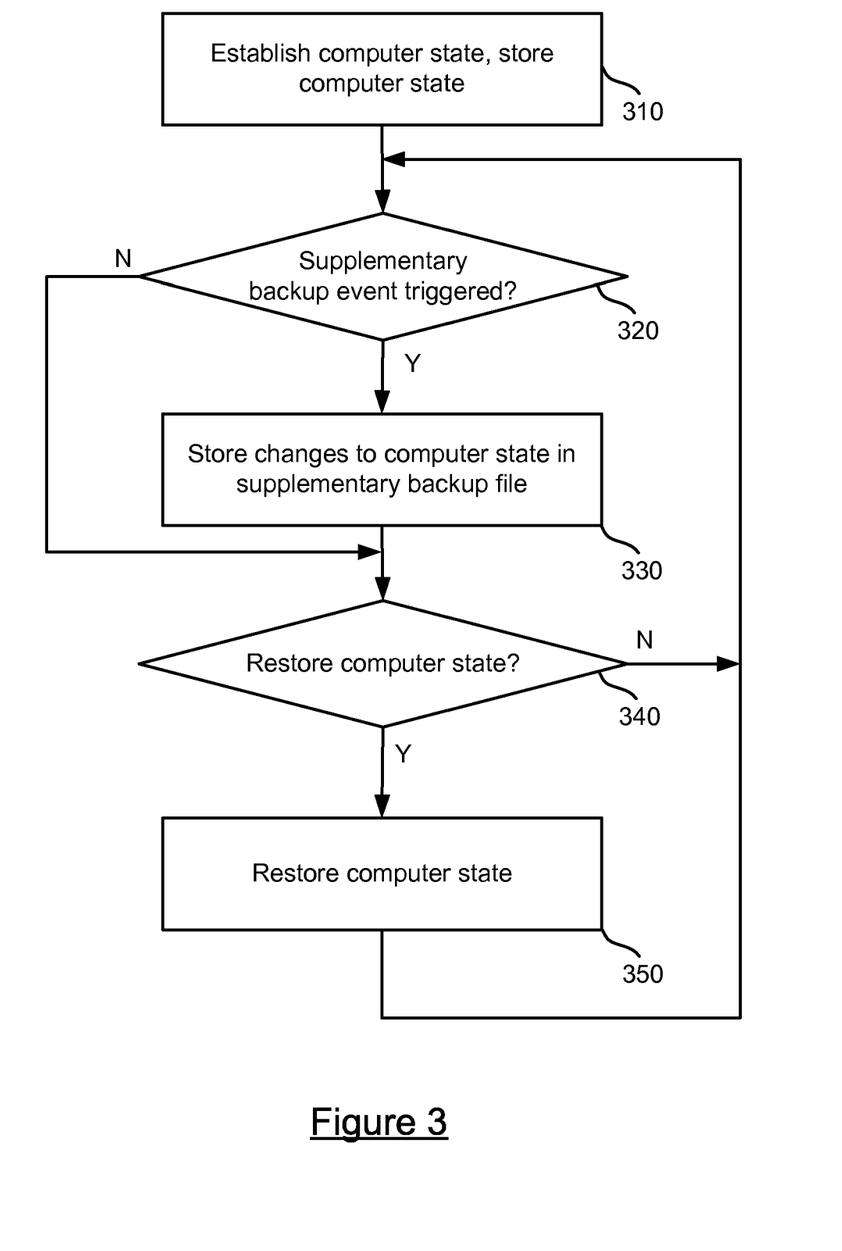
FIG. 3 is a flowchart of an embodiment of a process for establishing and restoring a computer state.

FIG. 3 is a flowchart of an embodiment of a process for establishing and restoring a computer state. First, a computer state is established and stored at step 310. Establishing a computer state may include installing an operating system on a computer, installing one or more applications, customizing various operating systems settings and application settings, and updating the applications and operating system settings over time. The computer state may be stored by saving restore data to a backup file and saving the backup file locally at client 110 or at remote data store 130. The restore data may include computer state information, a list of primary files, secondary files and other data. Establishing a computer store and storing the computer state is discussed in more detail below with respect to FIG. 4.

A determination is made as to whether a supplementary backup event is triggered at step 320. A supplementary backup event may be triggered based on an expired time period, a number of changes made to the computer state (such as installation of a primary application or change in operating system setting), a combination of these, a user request or some other cause. For example, a backup event may be triggered to occur every thirty days or after some number of applications have been installed or application updates have occurred, such as three application installations or updates. In some embodiments, a backup event may be triggered upon the earliest of every thirty days or three application installations or updates. If a supplementary backup event is not triggered, the process of FIG. 3 continues to step 340. If a supplementary backup event is triggered, changes to the computer state are stored in a supplementary backup file at step 330. In one embodiment, only the changes to the computer state are stored in the supplementary backup file. Thus, only new applications, the updates, a changed setting or other data which differs from the restore data stored saved at step 310 is stored. The amount of data stored at step 330 will generally be much less than the restore data stored at step 310. In some embodiments, the changes saved or stored at step 330 may be combined with the stored computer state of step 310. Combining the data may be done locally at client 110 or remotely by restore service 125 or restore manager 116 in combination with restore service 125. The process of FIG. 3 then continues to step 340.

A determination is made as to whether a computer state should be restored at step 340. A computer state may be restored for any of several reasons. In some embodiments, a computer state may be restored in response to a catastrophic event occurring to the computer. For example, the computer may crash, may be malfunctioning, or otherwise not in a desirable operating condition. In some embodiments, a user may choose to restore a computer state. If the computer state should not be restored at step 340, the process of FIG. 3 returns to step 320. If the computer state should be restored, the computer state is restored at step 350. Restoring the computer state involves restoring the computer state with the restore data saved at step 310 and any changes saved at step 330 discussed above. In restoring a computer state, primary file data is retrieved from a list of primary files, the primary files are retrieved from one or more file publishers and an update server, other data and secondary files are obtained from a restore file, and the computer state information, secondary files, and primary files are installed to the computer. Restoring a computer state is discussed in more detail below with respect to FIG. 5.

Figure 4:
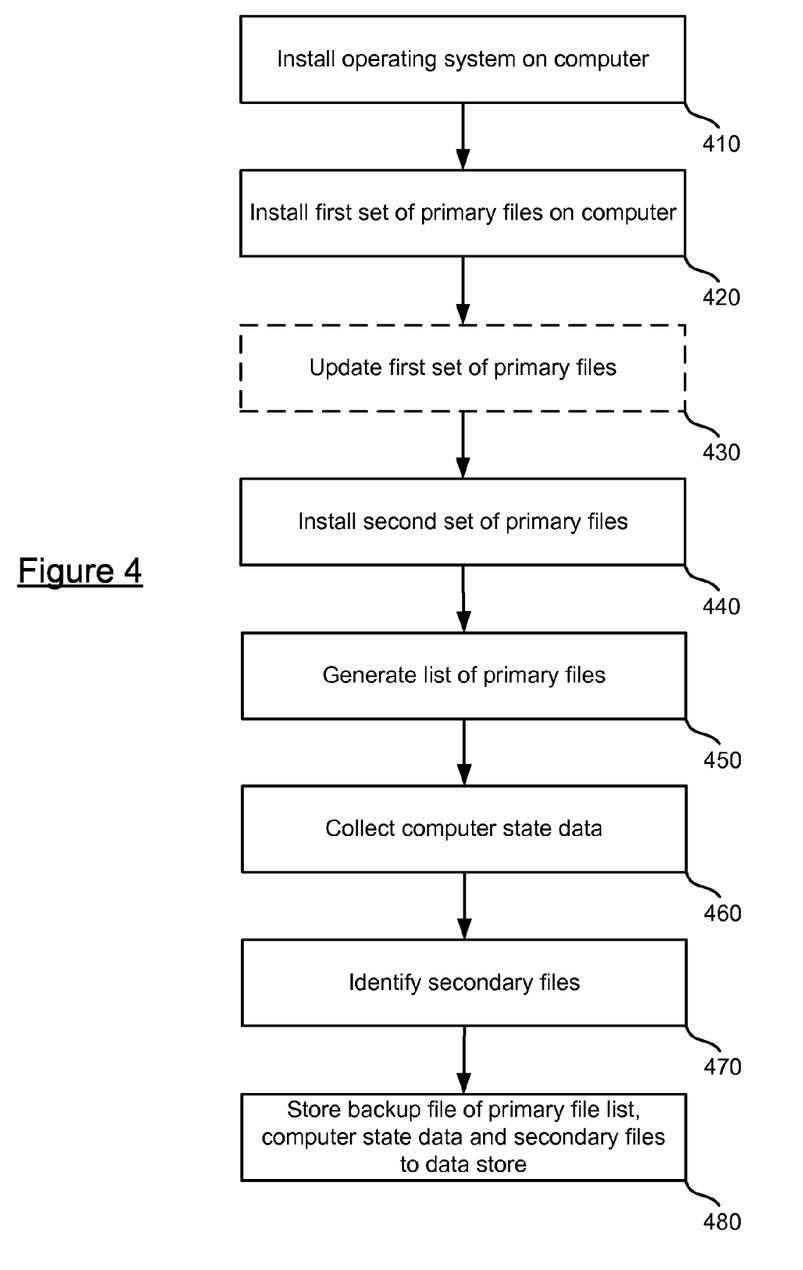
FIG. 4 is a flowchart of an embodiment of a process for storing a computer state.

FIG. 4 illustrates a flowchart of an embodiment of a process for establishing and storing a computer state. Steps 410-440 relate to establishing a computer state and steps 450-480 storing the computer state. The process of FIG. 4 provides more detail for step 310 of the process of FIG. 3. First, an operating system is installed on a computer. Installing an operating system on a computer may be done by inserting CDs, floppy disks, or other storage media into a computer media drive and booting up the computer. Next, a first set of primary files is installed on the computer. The primary files may be installed on the computer soon after the operating system is installed or over time. When a primary file is an application program, installing the application may include installing a number of binary files to the computer. The binary files may include executable files, templates, configuration files and other files associated with the application. Installing an application file may change entries in operating system registry 118 and other operating system maintained configuration stores. These changes may be used to identify what applications are installed on the computer and accessed by restore manager 116.

Installing a set of primary files on a computer may be done by a user by downloading each file or a collection of one or more packaged files over a network. Each primary file installed may be associated with a publisher such as one or file publishers 140-142 may be stored by restore manager 116. In this case, the "publisher" is the source from which the files are downloaded. In some embodiments, for each primary file installed on a computer, information is stored for the primary file such as name, publisher, version installed at installation, and date installed. For example, when the primary file is downloaded from over the Internet, restore manager 116 will record the network address (e.g., URL) of the publisher from which the application or primary file was retrieved. The URL of the publisher is added to the primary file list with the corresponding primary file. The primary file data stored by restore manager 116 may be accessed later when generating a backup file.

In some embodiments, restore manager 116 may have a trusted relationship with the file publisher(s) and/or update server from which it retrieves content such as primary files and other data during the restore process. The trusted relationship may prevent the likelihood of downloading content having a virus or some other invasion when the wrong files are restored. In this case, restore manager 116 does not need the URL or network address of a file publisher or update server; the restore manager "knows" the right location. In one embodiment, the file publisher and/or update server knowledge may be based on using the same registry/inf file detection used in the "add or remove programs" functionality of a control panel applet. This is a forensic approach that does not use code in the actual install path.

After installing a number of primary files on client 110, one or more of the primary files may be updated at step 430. As indicated by the dashed line comprising step 430 in the process of FIG. 4, step 430 is optional. When an application is updated, it can be done automatically by an update service or manually by a user. When done automatically, an update module (not illustrated) running on operating system 114 may periodically send an update query to an update server associated with an update service such as "Windows Update." In some embodiments, the update service may be associated with the operating system and a number of primary files provided by the same entity as the operating system (for example, "Windows XP Operating System" and "Microsoft Word" application, both provided by the entity Microsoft Corporation). The update service will then provide any updates or indicate no updates are currently available. When done or initiated by a user, an application may include code that checks for available updates from a publisher over a network each time the application is invoked. Updating a first set of primary files is discussed in more detail below with respect to the process of FIG. 5.

A second set of primary files is installed at step 440. The second set of primary files may be installed in a similar manner to those of step 430, except that the files may have a different publisher then that associated with operating system 114. The primary files installed at step 440 do not have a publisher in common or associated with update server 150 of operating system 114. For example, a second set of primary files installed on a computer having "Windows XP" operating system may include an application program "Adobe Acrobat" by Adobe Systems Incorporated. Similar to the primary files installed and updated in steps 420-430, information stored with the second set of primary files may include name, publisher, version, and date installed. In some embodiments, this data may be recorded by restore manager 116 when the primary file is accessed over a network and/or installed on the computer. In some embodiments, the restore manager may not participate in the installation of any files. Restore manager 116 may know nothing about the source of an application or file, but will know that the file is a primary file or secondary file.

Next, a list of primary files is generated at step 450. The list of primary files will be used to restore the primary files to the computer in case a computer state restore is desired. By only including a list of primary files rather than the primary files themselves, generating the computer state backup file and transferring the backup file to and from data store 130 is quicker and with less processing than if the primary files themselves were included. The list of primary files may include the name of the primary file, the file version, a publisher location for each file (such as a URL), and the date the file was installed.

Computer state data is then collected at step 460. The computer state data is the data associated with the state of client 110 which is not associated with a primary file or a secondary file. Examples of computer state data include registry information, computer name and setting information, and other information. As discussed above, the registry information stored may include data regarding computer hardware, selected system options, the configuration of computer memory, application programs recognized by the operating system, and other computer data.

Secondary files are identified at step 470. Secondary files are files which are not recognized as being accessible over a network. Files may be identified as either primary or secondary at the time they are saved to a backup file as restore data or the time they are restored to a computer from a backup file. Thus, files that are stored in a backup file as secondary files may be retrieved as primary files when the computer state is restored. This is discussed in more detail below. Each secondary file may be included in the backup file as one or more binary files, such as executable files, templates, configuration files, software drivers and other files. Since secondary files are not accessible over a network, they are not included in the list of primary files at step 450.

A backup file containing the restore data is stored at step 480. The restore data includes the primary file list, computer state data and secondary files. In some embodiments, all or part of the backup file may be stored as an XML document at data store 130 by client 110. Alternately, the backup file may be shredded by the restore service and stored in a database for rapid indexing. Storing the backup file may include sending a request to store the XML backup file to data store 130 from client 110, storing the backup file at data store 130 by restore service 125, and sending a confirmation response to client 110 by restore service 125 indicating that the backup file was successfully stored.

Figure 5:
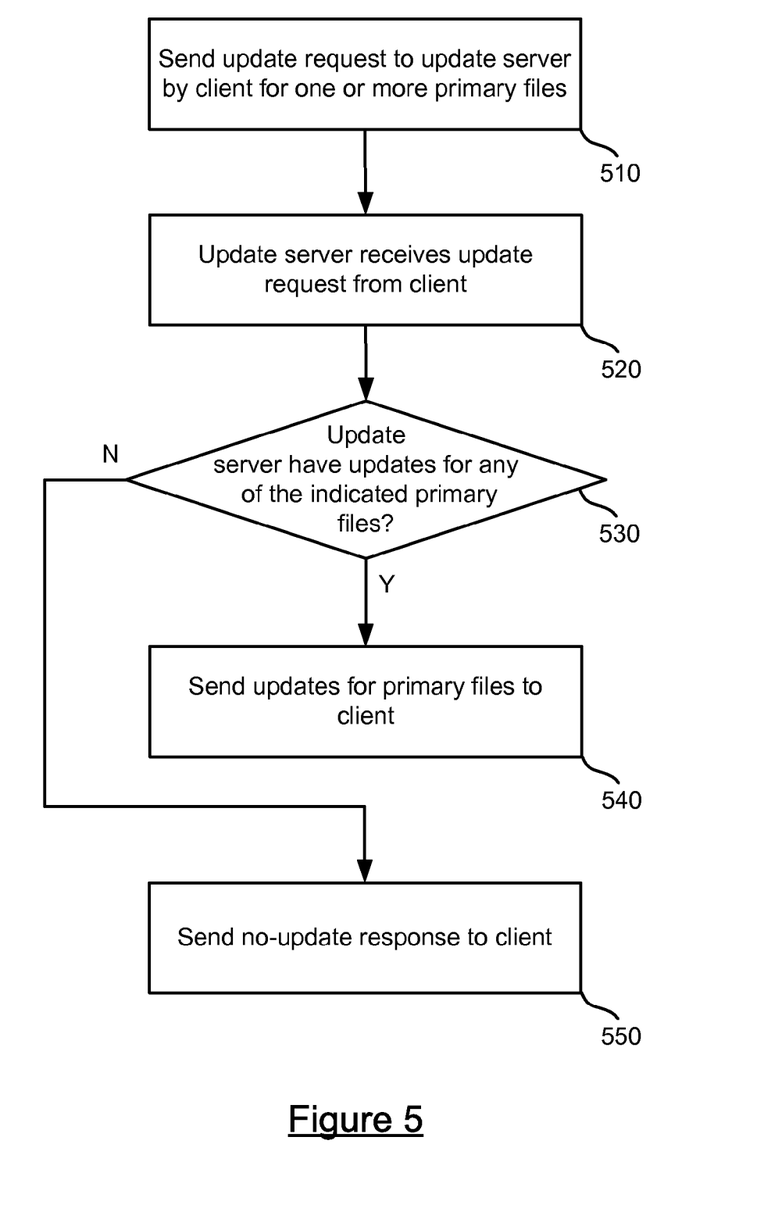
FIG. 5 is a flowchart of an embodiment of a process for updating a set of primary files.

FIG. 5 is a flowchart of an embodiment of a process for updating one or more primary files. In one embodiment, the process of FIG. 5 provides more detail for step 430 of FIG. 4. The process of FIG. 5 may be performed several times for different primary files. For example, if two primary files each have a different publisher, the process of FIG. 5 may be performed once for each primary file.

First, an update request is sent to update server 150 by client 110 at step 510. The update request queries update server 150 for any updates for one or more primary files. In some embodiments, the update request may be sent periodically by an update module at client 110 based on when the application was installed, an update service business rule, a time period managed by client 110, or some other period. In some embodiments, the update request may be sent in response to receiving a user request to update the particular file. The update request sent to update server 150 may include a list of primary files. The list of primary files may include information for each primary file, such as application name, application version, and the date of the last update for the particular applications to be updated.

Update server 150 receives the update request at step 520. A determination is made as to whether update server 150 has updates for any of the primary files included in the update request at step 530. Update server 150 compares the file names, versions, date of last update for each primary file and other optionally other information to the current update data for each primary file it has information for. If update server 150 determines that an update exists that is more recent than the last time the primary file was updated at client 110, updates for the primary file are sent to client 110 at step 540. If update server 150 does not have any updates for any of the first set of primary files, a no update response is sent to client 110 at step 550.

Figure 6:
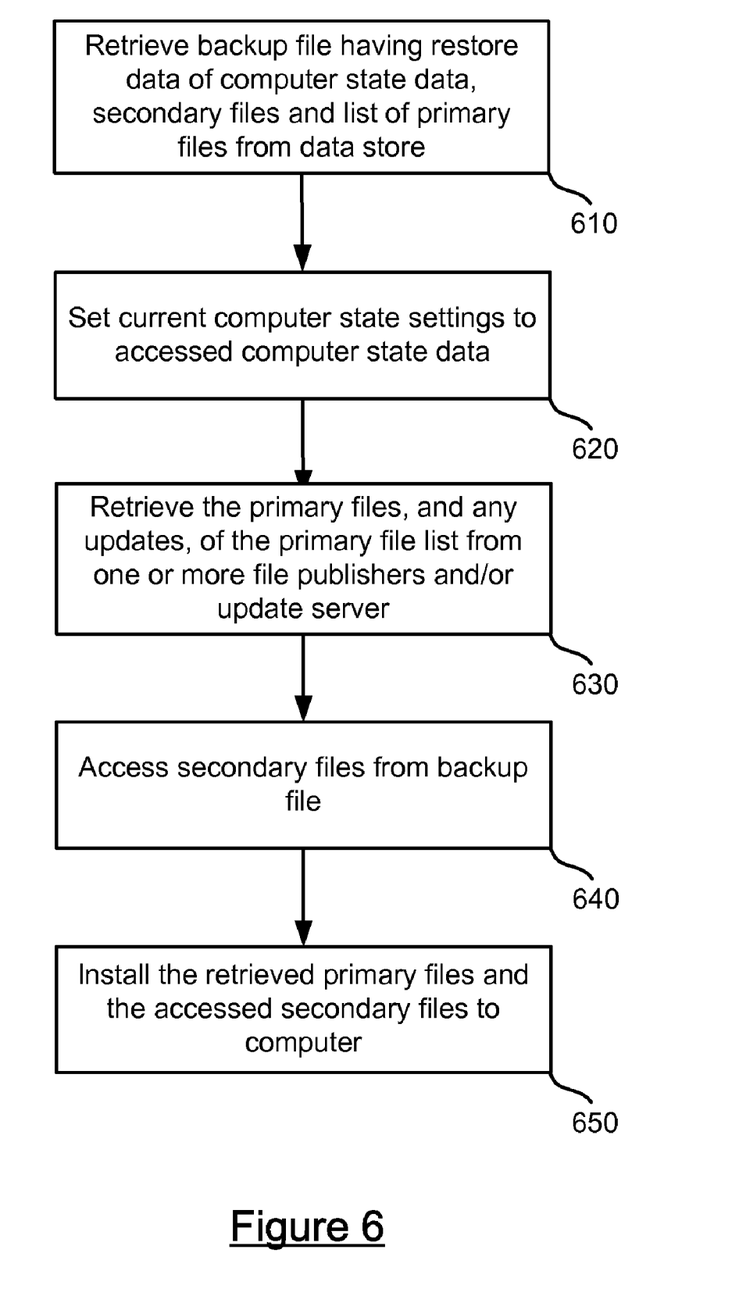
FIG. 6 is a flowchart of an embodiment of a hybrid process for restoring a computer state.

FIG. 6 includes a flowchart of an embodiment of a hybrid process for restoring a computer state. In some embodiments, the process of FIG. 6 provides more detail of step 350 of the process of FIG. 3. The process of FIG. 6 is a hybrid restoring process because files associated with the restored computer state are retrieved from a remote location over network 120 and locally from data at client 110. In particular, one or more primary files are retrieved from one or more remote publishers over a network and one or more secondary files are accessed locally from restore data already accessed at client 110.

First, a backup file containing restore data is retrieved at step 610. The backup file is a file that captures a state of client computer 110 and is generated stored as described with respect to step 310 of the process of FIG. 3 and the process of FIG. 4. The restore data in the backup file may include computer state data (e.g., registry data), one or more secondary files and a list of one or more primary files. The backup file may be retrieved by client 110 from data store 130 over network 120, from the client itself, or some other location. For example, client 110 may send a backup file request to data store 130. The request may include computer identification data, backup file identification data, computer state restore data or other data. Data store 130 may receive the request, process the request to access the backup file and/or restore data associated with the particular client and computer state, and send the requested backup file/restore data back to client 110 in a response.

In some embodiments, step 620 can be performed in parallel with any of steps 630-650 of the process of FIG. 6. The current computer state settings of client 110 are then set to the computer state data included in the restore data at step 620. Setting the current computer state settings using the computer state data in the retrieved backup file may include adding the registry data of the restore data to the computer operating system registry, adding third party drivers to the computer, and adding and configuring other data and settings in the accessed restore data to client 110. Next, primary files from the primary files list and any corresponding updates for the primary files are retrieved from one or more of publishers 140-142 and/or update server 150 at step 630. Thus, rather than receiving the entire content of each primary file in the restore data, the primary files included in the primary files list are each accessed over network 120 from file publishers 140-142. Each primary file and any corresponding updates may be retrieved using file publisher information included in the primary file list. Restore from multiple file publishers and update services may be performed in parallel. Retrieving the primary files and any corresponding updates from the primary files list is discussed in more detail below with respect to FIG. 7.

One or more secondary files are accessed from the backup file at step 630. The one or more secondary files were written to the backup file as discussed above at step 480 in the process of FIG. 4. Each accessed secondary file may include one or more binary files, such as an executable file, drivers, and other files.

The retrieved primary files and accessed secondary files are installed in client 110 at step 650. Primary file updates retrieved over network 120 by client 110 may be installed as well. In some embodiments, the one or more primary files and one or more secondary files may be installed by restore manager 116.

Figure 7:
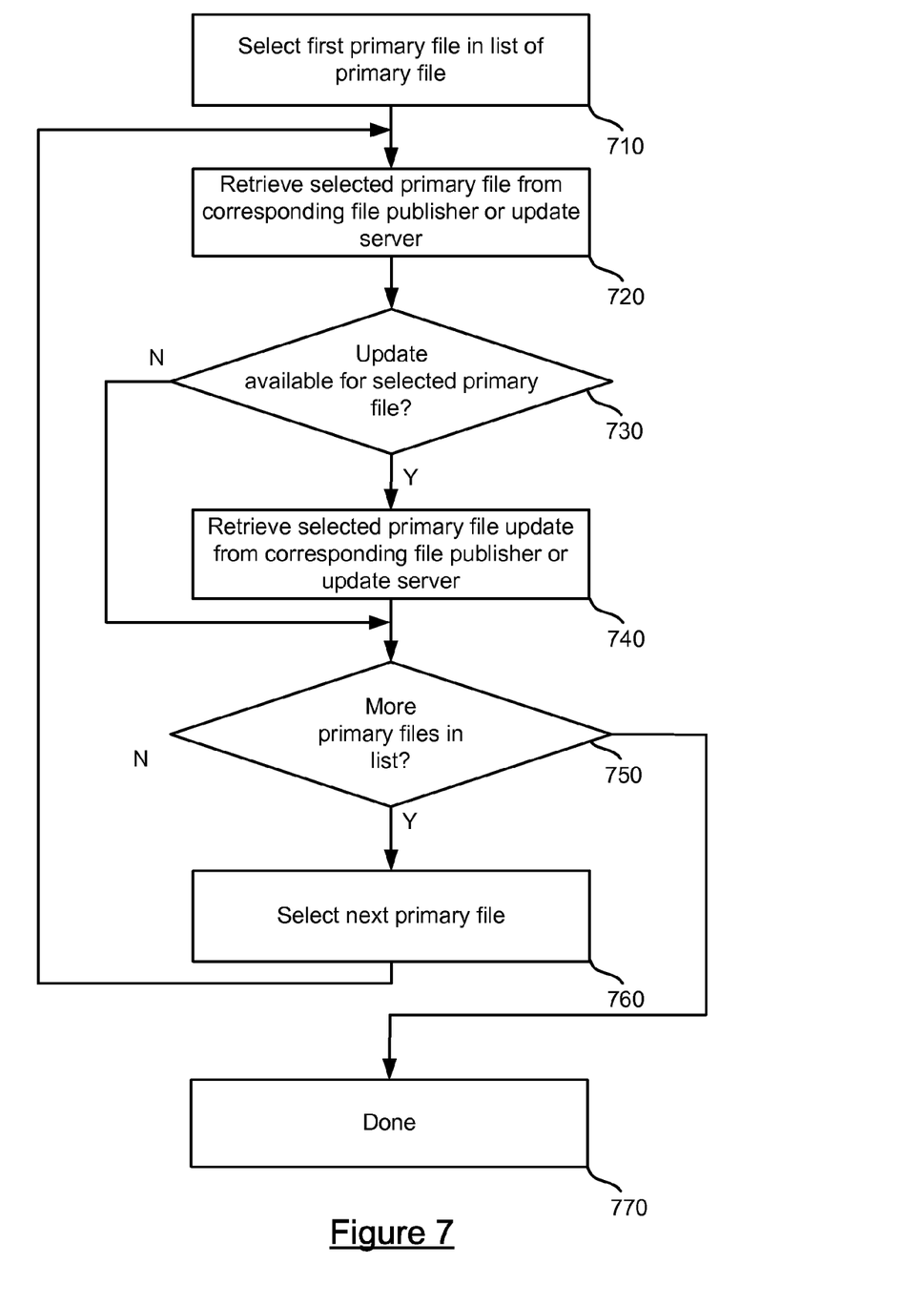
FIG. 7 is a flowchart of an embodiment of a process for retrieving primary applications and application updates.

FIG. 7 is a flowchart of an embodiment of a process for retrieving primary files and corresponding application updates. In one embodiment, the process of FIG. 7 provides more detail for step 630 of FIG. 6 and may be performed by restore manager 116 of client 110. First, the first primary file in the list of primary files is selected at step 710. The selected primary file is then retrieved from a file publisher or update server that can provide the selected primary file at step 720. Retrieving the selected primary file may include sending a request for the primary file by restore manager 116 to one of file publishers 140-142 (or update server 150) associated with the primary file, receiving the request by the file publisher (or update server 150) and sending the primary file to client 110. In some embodiments, the primary files may be retrieved by restore service 125, one or more agents on client 110 on behalf of a file publisher or client operating system, or in some other manner. Retrieving a selected primary file may include restoring a group of files that comprise the primary file. In some embodiments, the request to the file publisher (or update server 150) may be sent to a network location, such as a URL, that is included in the list of primary files and associated with the primary file being retrieved.

A determination is then made as to whether an update is available for the selected primary file at step 730. This determination may be made by sending a request by restore manager 116 to the corresponding file publisher or update server from which the primary file is available. In some embodiments, the request for the primary file and any primary file update may be made in the same request to the file publisher. The update request may include the date the primary file was installed or last updated, update identification information for the last update received for the primary file, or other data. If no updates are available for the selected primary file, the process of FIG. 7 continues to step 750. If the file publisher or update server which receives an update request determines an update is available for the primary file, the selected primary file update is provided in a response to requesting client 110 at step 740. After retrieving the selected primary file update, the process of FIG. 7 continues to step 750.

A determination is made as to whether there are more primary files on the list of primary files at step 750. If there are no more primary files on the list, then all the primary files and corresponding updates from the list have been downloaded and the process of FIG. 7 is complete at step 770. If more primary files exist on the list, the next primary file is selected at step 760 and the process of FIG. 7 continues to step 720.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A computer implemented method for restoring a computer state, comprising:
   retrieving restore data for a computer by a first module, the restore data containing computer state data, one or more second files and a list of one or more first files previously installed on the computer and associated with a first computer state;
   retrieving one or more of the first files in the list by the first module from one or more file publishers over a network, the one or more file publishers are sources that distribute the first files publically over the network;
   installing one or more of the retrieved first files, the one or more second files and the computer state data to the computer to restore the first computer state to the computer.

2. The method of claim 1, wherein the restore data includes one or more second files not contained in the list of first files and not retrieved over the network from the one or more file publishers by the first module, the method further comprising:
   accessing the one or more second files by the first module from the restore data, the one or more second files previously installed on the computer and associated with the first computer state.

3. The method of claim 1, wherein said step of retrieving restore data includes:
   providing a restore data request over a network to a back-up data store; and
   receiving restore data from the back-up data store in response to the request.

4. The method of claim 1, wherein said step of retrieving one or more of the first files includes:
   retrieving one or more application programs from one or more publishers of the applications, the one or more publishers of the applications are sources that distribute the applications publically over the network.

5. The method of claim 1, wherein the list of one or more first files includes file name data.

6. The method of claim 1, wherein said step of retrieving restore data includes:
   accessing operating system registry data associated with the first computer state.

7. The method of claim 1, further comprising:
   installing an operating system on the computer, the operating system associated with the first state and including a first module;
   accessing an update server to obtain updates to the operating system that are identified in the restore data; and
   automatically installing the updates to the operating system that are identified in the restore data.

8. The method of claim 1, wherein:
   the retrieving one or more of the first files in the list includes receiving one or more updates for one or more of the retrieved first files by the first module from a publisher of the updates the publisher of the updates is a source that distributes the updates publically over the network; and
   the installing one or more of the retrieved first files includes installing the one or more updates to the one or more of the first files on the computer, at least one of the updates was first published after the first computer state was saved.

9. The method of claim 1, wherein said step of installing restores the computer to the first computer state.

10. The method of claim 1, further comprising:
    restoring an operating system for the computer, the operating system including the first module;
    receiving one or more updates for one or more of the first files by the first module;
    installing the one or more updates on the computer;
    accessing operating system data from the restore data; and
    configuring the operating system with the operating system data.

11. The method of claim 1, wherein the one or more file publishers are owners of the one or more of the first files in the list.

12. A computer system, comprising:
    a processor;
    a computer storage medium coupled to the processor, the computer storage medium having processor readable code embodied thereon, said processor readable code for programming the processor to perform a method comprising:
    generating a list of first one or more applications or files, the list containing one or more first files or applications which are installed on the computer system and accessible from one or more file publishers over a network, the one or more file publishers distribute the first files publically over the network;
    accessing computer state data from an operating system of the computer system;
    identifying second files installed on the computer that are not accessible from the one or more file publishers; and
    automatically saving the computer state data, the one or more second files and the list as restore data in a backup file.

13. The computer system of claim 12, further comprising:
    retrieving one of the first files or applications in the list from a network address associated with one of the one or more publishers; and
    storing the network address of the one or more publishers with the first file in the list.

14. The computer system of claim 12, wherein said step of saving includes:
    saving a main backup file; and
    saving one or more supplementary backup files that indicate a change from the last saved main backup file or subsequently saved supplementary backup file.

15. The computer system of claim 12, further comprising:
    receiving update identification information for one or more first files by the computer system from an update server over the network; and
    saving the update identification information as restore data in the backup file.

16. The computer system of claim 12, wherein said step of saving includes:
    configuring the restore data by the computer system; and
    transmitting the restore data to a data store over the network.

17. The computer system of claim 12, further comprising:
    determining a set period of time has elapsed;
    identifying any differences in the computer state at the end of the time period with respect to computer state at the beginning of the time period; and
    storing the restore data differences as a supplementary backup file.

18. One or more processor readable storage devices having processor readable code embodied on said processor readable storage devices, said processor readable code for programming one or more processors to perform a method comprising:
 determining a first file located on a computer for which there is either a publisher that distributes the first file publically over a network or an update server that provides updates to the first file;
 configuring a listing for the first file that contains information to automatically invoke either the update service or the publisher of the first file;
 providing a list of one or more first files and computer state data in a backup file to a restore server, the list of one or more first files including the listing for the first file;
 retrieving the backup file by a first module on the computer from the restore server; and
 automatically invoking either the update server or the publisher by the first module to install the first file to the computer, the first module uses the listing for the first file to automatically invoke either the update server or the publisher.

19. One or more processor readable storage devices of claim 18, wherein said step of invoking includes:
 automatically invoking the update server by the first module to install one or more updates for the first file to the computer, the one or more updates for the first file are first published after providing the list of one or more first files and the computer state data to the restore service.

20. The one or more processor readable storage devices of claim 18 further comprising:
 identifying second files installed on the computer that are not accessible from the one or more file publishers and are not supported by the update server; and
 providing the second files in the backup file to the restore server.

* * * * *